A. F. HOFFMAN.
PROCESS OF PICKLING IRON AND STEEL.
APPLICATION FILED OCT. 17, 1914.
1,146,071.
Patented July 13, 1915.
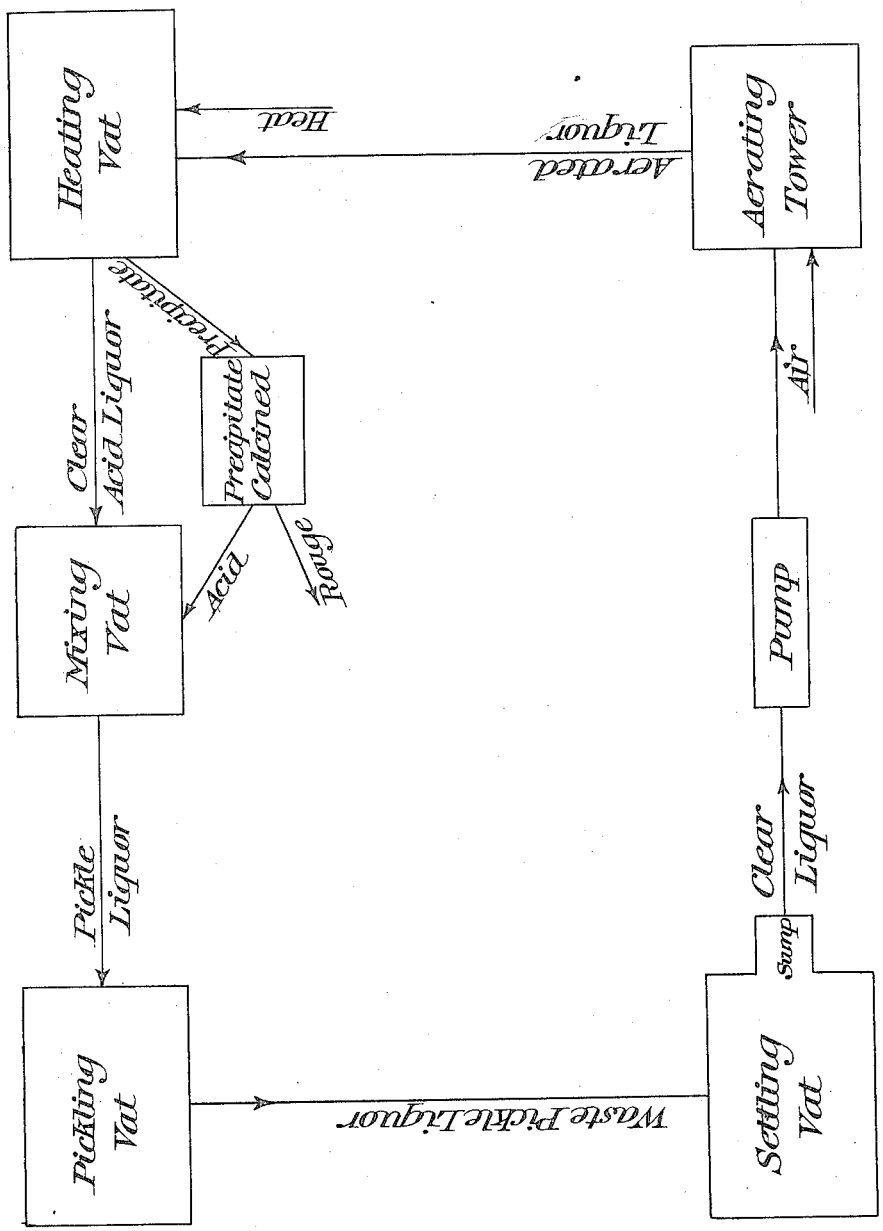

ively without loss, except

UNITED STATES PATENT OFFICE.

ADDISON F. HOFFMAN, OF PITTSBURGH, PENNSYLVANIA.

PROCESS OF PICKLING IRON AND STEEL.

1,146,071. Specification of Letters Patent. Patented July 13, 1915.

Application filed October 17, 1914. Serial No. 867,217.

*To all whom it may concern:*

Be it known that I, ADDISON F. HOFFMAN, a citizen of the United States, residing at Pittsburgh, in the county of Allegheny and State of Pennsylvania, have invented new and useful Improvements in the Process of Pickling Iron and Steel, of which the following is a specification.

My present invention relates to new and useful improvements in the art of pickling iron and steel articles, and has for its especial objects, the handling and regeneration of the waste pickle liquor, in such a manner that this can be used over and over again, substantially without loss, except such losses as are due to leakage and the losses incident to handling.

It is the usual practice to pickle iron or steel articles by immersing them in a bath of dilute sulfuric acid, in order to remove scale, rust and the like, the strength of the acid generally used being from two and a half to fifteen per cent. and about four to eight per cent. being the average strength.

When the acidity of the solution has fallen to about two per cent. or less, the waste liquor is ordinarily thrown away, although it has previously been proposed to recover iron sulfate crystals, pigments and the like, from this waste liquor.

In operating in accordance with my process, when the strength of the pickle liquor dropped to about one-half to two per cent. free sulfuric acid, I draw off this waste pickle liquor into a suitable settling tank and allow the same to stand for some time, in order to settle, as completely as possible. The supernatant liquid is then drawn off. Instead of settling, I may pass the liquid through a suitable filter of similar device, to remove suspended solids. The liquid is then aerated by allowing the same to trickle downwardly through a tower, in which coke, pebbles, baffle plates or the like are inclosed, in order to oxidize the major portion of its content of ferrous sulfate to ferric sulfate, air being admitted to said tower at the bottom. In passing the liquid downwardly through this device, no alkali or neutralizing agent whatever is to be added to the liquid. About 95% of the iron will readily be oxidized from ferrous sulfate to ferric sulfate, by passing through such a device one or more times.

The liquid after aeration is heated to boiling, in an open or closed tank, which step causes the precipitation of a large amount of the iron present, mostly in the form of basic ferric compounds and the consequent liberation of a considerable amount of free acid. The liquid is then filtered or decanted while hot, in order to separate the free acid from the precipitate of basic ferric compounds. The liquid may if desired be treated with a small amount of sulfuric acid, after filtration or decantation, in order to bring up the strength to the desired degree of acidity. The liquid may then be allowed to cool more or less, and is then ready for use in pickling iron articles.

The precipitate obtained during the boiling operation appears to consist principally of basic ferric sulfate, with perhaps a small amount of normal ferric sulfate, and other ferric compounds, and may be calcined or heated in a muffle, to a temperature of about 1100° F., at which temperature it is converted into ferric oxid (rouge suitable for use as a pigment or polishing powder) and $SO_3$. The latter may be absorbed, to regenerate sulfuric acid for addition to the bath. In this manner I can continue the use of the same pickle liquor with frequent regenerations, almost indefinitely the only loss being the small amount of loss due to leakage and handling, and I also am able to secure a valuable by-product in the form of the ferric oxid produced.

The step of heating the precipitated ferric compounds to produce free sulfuric acid and ferric oxid, may under certain conditions be omitted if the boiling has been carried on to such an extent, that the liquid from this step contains sufficient free acid, to again be economically used in pickling. Also this step of heating the precipitate may be omitted entirely, and sulfuric acid from an outside source used for bringing up the acidity of the pickling solution. The step of heating the precipitated ferric compounds may be also carried on independently of the use of the sulfuric acid thereby formed, in pickling, for example where the precipitate is sold or shipped to another plant, for carrying out this operation. However, I prefer to carry out this step in combination with the pickling and regeneration of the pickle liquor, for the reason that in this manner the sulfuric acid is regenerated, in the same plant, in which sulfuric acid is employed, although the sulfuric acid produced by this heating operation is a pure and concentrated acid, suitable for use as sulfuric acid in various other operations.

While the regenerated pickle liquor, always contains a considerable quantity of iron, and hence would not be particularly useful, for general operations in which sulfuric acid would be employed, these ferric compounds present therein do not injure its use for pickling iron or steel, but on the contrary they improve its value for this purpose, since the hydrogen liberated by the pickling operation acts upon the ferric sulfate contained in the pickle liquor, to convert the same into ferrous sulfate with the liberation of an additional quantity of sulfuric acid. It also appears probable that the ferric sulfate itself, in the presence of an acid will act upon iron, to form ferrous sulfate, thereby aiding the pickling operation.

The accompanying drawing shows, diagrammatically, the complete apparatus used in the process of pickling the ferrous articles, and regenerating the pickle liquor.

In said drawing, the waste pickle liquor from the pickling vat may be conveyed to a settling vat, in which the solid material carried in suspension is allowed to settle. The clear liquor is then pumped into the upper part of the aerating tower, air being blown in at the bottom of said tower. This step is performed at substantially atmospheric temperature. From the bottom of the aerating tower, the liquor is conveyed to the heating vat in which it is heated, for example by means of steam coils, thus causing the precipitation of basic ferric compounds. After settling the clear liquor is allowed to flow to the mixing vat, the precipitate being drawn off to a suitable calcining apparatus in which it is calcined, the acid thus produced being added, if desired to the liquid in the mixing vat, and the calcined product, rouge, being removed as a by-product. From the mixing vat the regenerated pickle liquor is conveyed back to the pickling vat.

While I have shown the several vats arranged in the form of a rectangle, it is obvious that any other suitable arrangement can be made. While I have shown a pump between the settling vat and the aerating tower, this pump may be placed at any other part of the system, or pumps may be placed in several of the pipes, if desired.

What I claim is:—

1. In a cyclical process of treating ferrous articles the improvement which comprises pickling the same in a bath of dilute acid, separating the waste pickle liquor from the ferrous articles, aerating the waste liquor, heating the same sufficiently to cause a precipitation of ferric compounds and a regeneration of free acid, separating the precipitate from the liquor and thereafter treating ferrous articles with this regenerated liquor.

2. A cyclical process of pickling ferrous articles, which comprises pickling said articles in a bath containing sulfuric acid, separating the waste pickle liquor from the ferrous articles, separating the solids in suspension from said liquor, aerating said liquor at ordinary temperature, heating said aerated liquor to boiling, to cause a precipitation of basic ferric compounds, separating said basic ferric compounds from said hot liquor, adding free acid to said liquor, and again pickling iron articles therein.

3. A cyclical process of pickling ferrous metal articles which comprises pickling ferrous articles in a bath of dilute sulfuric acid, separating the waste pickle liquor from the articles being treated, aerating said pickle liquor at ordinary temperature, heating said aerated liquor sufficiently to cause a precipitation of ferric compounds therefrom, separating said precipitate from said liquor, heating said ferric compounds to generate free sulfuric acid, adding sulfuric acid to said liquor from which precipitated ferric compounds have been removed, and pickling ferrous metal articles in the regenerated pickle liquor.

4. In the pickling of ferrous metal articles, the step of regenerating the waste pickle liquor which comprises aerating the waste pickle liquor at ordinary temperature, heating the aerated liquor sufficiently to cause a precipitation of ferric compounds therefrom, separating the precipitate from the liquor, heating the precipitate sufficiently to drive off its content of acid and adding acid to the liquor from which the precipitate has been removed.

In testimony whereof I affix my signature in presence of two witnesses.

ADDISON F. HOFFMAN.

Witnesses:
ANNA L. NORTON,
MALCOLM GOLDSMITH.